United States Patent
Che Daud et al.

(10) Patent No.: US 11,819,784 B2
(45) Date of Patent: Nov. 21, 2023

(54) SAND CLEANING AND DISPOSAL SYSTEM AND METHOD

(71) Applicant: Petroliam Nasional Berhad (PETRONAS), Kuala Lumpur (MY)

(72) Inventors: Mohammad Faizal Bin Che Daud, Kuala Lumpur (MY); Maung Maung Myo Thant @ Feroz Sultan, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 16/630,764

(22) PCT Filed: Jul. 10, 2018

(86) PCT No.: PCT/MY2018/050046
§ 371 (c)(1),
(2) Date: Jan. 13, 2020

(87) PCT Pub. No.: WO2019/013614
PCT Pub. Date: Jan. 17, 2019

(65) Prior Publication Data
US 2021/0146280 A1   May 20, 2021

(30) Foreign Application Priority Data
Jul. 14, 2017   (MY) .................. PI 2017001048

(51) Int. Cl.
*B01D 21/26*   (2006.01)
*E21B 43/34*   (2006.01)
(Continued)

(52) U.S. Cl.
CPC ......... *B01D 21/26* (2013.01); *B01D 17/0205* (2013.01); *B01D 21/009* (2013.01);
(Continued)

(58) Field of Classification Search
CPC .. B01D 21/26; B01D 21/2411; B01D 21/009; B01D 21/2444; B01D 17/0205;
(Continued)

(56) References Cited

U.S. PATENT DOCUMENTS 1,920,565 A * 8/1933 Jones ................. B01D 17/0211
  516/190
3,598,239 A * 8/1971 Mackrle ................ C02F 1/5281
  210/208

(Continued)

FOREIGN PATENT DOCUMENTS

| CA | 2216063 A1 | 5/1999 |
| CN | 205412788 U | 8/2016 |
| WO | 2012061897 A1 | 5/2012 |

OTHER PUBLICATIONS

Chen (CN 205412788) original and machine translation attached (Year: 2016).*

(Continued)

*Primary Examiner* — Liam Royce
(74) *Attorney, Agent, or Firm* — Mannava & Kang, P. C.

(57) ABSTRACT

A system for sand cleaning including: a cleaning unit arranged to receive oil impregnated sand; the unit including a chamber having an impeller, said impeller arranged to agitate the oil impregnated sand in a base of the unit; an (Continued)

aperture in the base of the unit arranged to discharge the treated sand; an oil outlet adjacent to a top of the unit arranged to discharge the separated oil.

10 Claims, 5 Drawing Sheets

(51) Int. Cl.
    *B01D 17/02*      (2006.01)
    *B01D 21/00*      (2006.01)
    *B01D 21/24*      (2006.01)
    *C10G 1/04*      (2006.01)

(52) U.S. Cl.
    CPC ...... *B01D 21/2411* (2013.01); *B01D 21/2444* (2013.01); *C10G 1/04* (2013.01); *E21B 43/35* (2020.05)

(58) Field of Classification Search
    CPC .. B01D 17/0214; B01D 17/047; B01D 17/00; B01D 1/16; B01D 5/0027; B01D 11/0234; E21B 43/35; C10G 1/04; B09C 1/02; B09C 1/062; B03D 1/1431; B03D 1/16; B01F 27/90
    See application file for complete search history.

(56) References Cited

U.S. PATENT DOCUMENTS

| | | | |
|---|---|---|---|
| 4,067,796 A | | 1/1978 | Alford et al. |
| 4,172,025 A | | 10/1979 | Porteous et al. |
| 4,722,782 A | | 2/1988 | Graham et al. |
| 6,296,384 B1 | * | 10/2001 | Yatomi ............... B01F 27/1125 366/147 |
| 2005/0194322 A1 | * | 9/2005 | Palmer ............... B01D 21/2444 210/715 |
| 2007/0056611 A1 | | 3/2007 | Martin |
| 2010/0059415 A1 | | 3/2010 | Kujawa |
| 2013/0248424 A1 | | 9/2013 | Yuan et al. |

OTHER PUBLICATIONS

International Search Report and Written Opinion dated Sep. 19, 2018, PCT Patent Application No. PCT/MY2018/050046, filed Jul. 10, 2018, Australian Patent Office, 9 pages.

* cited by examiner

SAND CLEANING AND DISPOSAL SYSTEM AND METHOD

PRIORITY

The present application is a national stage filing under 35 U.S.C 371 of PCT application number PCT/MY2018/050046, having an international filing date of Jul. 10, 2018, which claims priority to Malaysian patent application number PI 2017001048 having a filing date of Jul. 14, 2017, the disclosures of which are hereby incorporated by reference in their entireties.

FIELD OF THE INVENTION

The invention relates to the extraction process of crude oil and specifically the portion of the process upstream from refining. In particular, the invention is directed to the means of sand mitigation removal and disposal during the extraction process.

BACKGROUND

The invention relates to the upstream extraction of crude oil through a well screen and subsequently through the well head and delivery to a separator prior to transfer for refining.

The inevitable inclusion of sand in the flow of crude oil from the below ground reservoir represents a significant cost and downtime of the upstream equipment prior to refining with sand measuring typically in the thousands of tonnes per day which must ultimately be removed. On removal, the cost associated with its handling & transportation to an authorized disposal site is also significant as is the loss of oil still adhering to the sand which is ultimately lost on disposal.

It is possible to remove sand upstream from the separator using a de-sander, however such equipment may not be infallible and therefore there are still issues of accumulation of sand in the separator and other vessels including settlement of sand when the transport velocity drops below the limiting sediment velocity.

The subsequent removal of sand in the pipes and vessels is labour intensive and time consuming, leading to the aforementioned equipment downtime. The subsequent transportation of the sand for onshore treatment is also expensive hence the alternate process to treat the waste sand for safe environmental offshore disposal.

SUMMARY OF INVENTION

In a first aspect, the invention provides a system for sand cleaning including: a cleaning unit arranged to receive oil impregnated sand; the unit including a chamber having an impeller, said impeller arranged to agitate the oil impregnated sand in a base of the unit; an aperture in the base of the unit arranged to discharge the treated sand; an oil outlet adjacent to a top of the unit arranged to discharge the separated oil.

In a second aspect, the invention provides a method for the cleaning of contaminated sand, the method including the steps of: receiving a batch of the contaminated sand; agitating said contaminated sand, and consequently; separating a liquid layer of contaminant from the sand; removing the liquid layer of contaminant; removing excess liquid, and; discharging the sand.

Accordingly, the invention provides a unit providing mechanical agitation, and arranged to agitate a volume of contaminated sand for the purpose of separating the oil from the sand. In one embodiment the unit is arranged to receive a separation compound such as a surfactant to facilitate the oil sand separation. In a further embodiment the oil impregnated sand may be received in the unit in a fluidized state. Alternatively, water may be added to the unit so as to place the oil impregnated sand into the fluidized state whilst in the unit.

The unit may be encased in a cage facilitating the transport of the unit to remote locations so as to receive the untreated sand at sites with sand production, for on site treatment of the sand.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
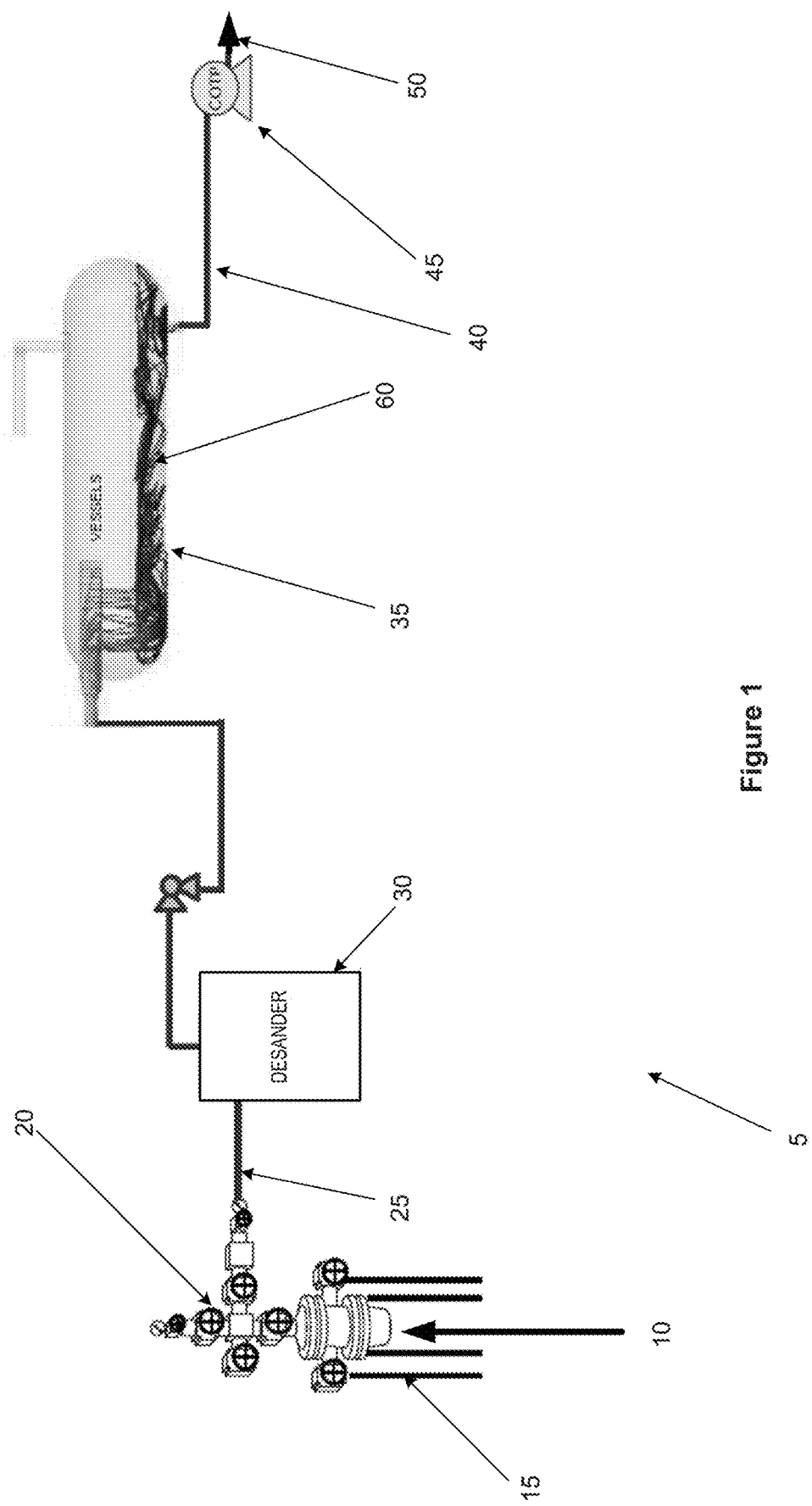
FIG. 1 is a schematic view of an extraction process for crude oil according to the prior art.

FIG. 1 shows a schematic view of an oil extraction process 5, whereby oil is extracted 10 from a well screen (not shown) mounted to pipework 15. The oil is delivered from a well head 20 through pipe work 25 to eventually reach a vessel such as. a production separator 35. In series with the pipe work 25 between the well head and separator 35 will typically be a de-sander 30 for removing as much sand as possible that has been extracted along with the oil from the well screen. Following separation a pump/pipe network 40, 45 then delivers 50 the oil for downstream processing.

During the separation process typically oil impregnated sand 60 will accumulate in the base of the separator 35 as the velocity of the oil reduces and thus allows the sand to settle. Similarly, as the velocity of the oil in the pipe work 25, 40 falls below a limiting transportation velocity, oil impregnated sand will consequently settle out of the oil stream into the base of the pipe.

Receiving large volumes of oil impregnated sand is an inevitable consequence of aging reserves whereby the reservoir pressure has sufficiently declined so as to permit the ingress of sand. The use of de-sanders can reduce the volume of sand being deposited in the pipework and separator, however in the event that de-sanders themselves are not completely efficient and there will inevitably be sand to be periodically removed and disposed of.

Newer separators often include de-sanders or sand jetting facilities, which may not be present in older separators. Sand deposited in pipes, however, will generally only be removed through de-sanding pigs passed through the pipes and so require manual removal.

The flow constraint caused by the deposited sand represents a loss of functionality of the system not to mention damage caused should the sand be permitted to transport throughout. Nevertheless, the sand must be removed prior to reaching the export facilities and hence systems put in place for the removal.

Figure 2:
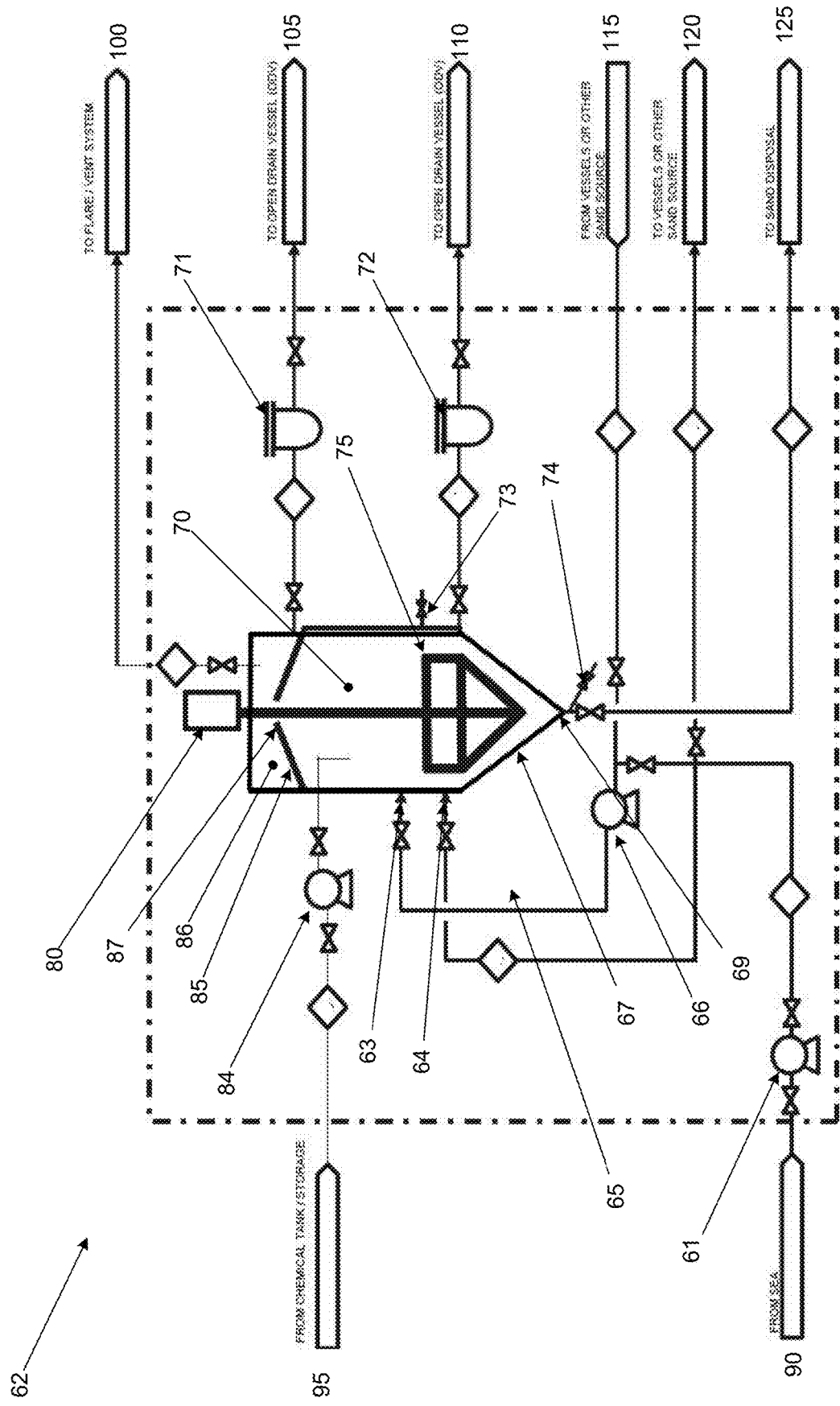
FIG. 2 is a schematic view of a sand cleaning system according to one embodiment of the present invention.

FIG. 2 shows a schematic view of a sand cleaning, or treatment, process 62 according to the present invention. At the centre of the process is a treatment and agitation unit 65 having an internal chamber 70 into which the untreated sand is received, possibly in a fluidized form. The untreated sand may be impregnated with a contaminant, such as oil.

In practice the agitation may take about 5 minutes with a settling time of 1-1½ hours depending upon on various factors that may include but not limited to size of the particles and oil properties. The tank itself may preferably be cylindrical and generally upright such that the diameter of the tank is less than the height. This has the benefit of, firstly, aiding in the gravity discharge of the various components following the cleaning process. Further, in this orientation, the footprint taken by the cleaning tank is reduced with the consequential benefits.

One objective of the cleaning process is to separate the contaminant from the sand such that following treatment/cleaning the contaminant proportion in the treated sand, being less than 1%.

In cleaning the contaminated sand the liquid content of the sand itself may be sufficient to allow shearing of the sand by the impeller and to aid the effect of the surfactant, if added. In a further embodiment, water may be added as well as, or instead of, the surfactant to aid in the fluidization of the contaminated sand. The system according to the present invention may then be selectively adjustable so as to control the input of water into the unit or alternatively to mix water with the contaminated sand prior to introduction to the unit.

Dimensions of the cleaning tank may vary based upon its location and use. For instance, for a 500 kg load of contaminated sand the dimensions of the cleaning tank may be 1.5 m in diameter and 2 m in height, including the base of the unit. The base may be a conical section of height 0.8 m, with an incline of 40° from the vertical.

It will be appreciated that a range of sizes may be used for the cleaning tank. The dimensions may be a function of, for instance, sand volume, with or without surfactant, water volume inclusion, mobility requirement etc.

The unit may receive a separation compound for separating the oil from the untreated sand. The agitation unit in this case is a rotary impeller 75 mounted to a geared motor 80 and arranged to rotate so as to stir the sand, by shearing through and fully mixing the separation compound and oil impregnated sand.

Rotation of the impeller 75 may be in a uniform direction until the agitation is complete. Alternatively, the impeller may be arranged to rotate reciprocally such as a half rotation or full rotation in alternating directions.

The unit 65 includes an oil trap 86 located at the top of the unit 65, and defined by a conical weir 85 as the base of the oil trap 86. The conical surface 87 is intended to reduce the oil interface area and produce a thicker oil layer as it approaches the top of the weir through the opening 87. The conical weir reduces the opportunity for trapped oil to re-enter the chamber 70 that would otherwise occur if it were a planar surface.

The unit may be elongate and arranged vertically, with the vertical orientation of the chamber 70 allowing solids to be more easily removed as well as reducing the time for liquid to reach the conical weir 85. It also provides for a greater separation distance between the sand and floating oil layer. The impeller 75 prevents the adherence of sand to the wall by shearing through the accumulated sand thus aiding the agitation.

As the underlying objective for the use of the cleaning system, according to the present invention, is to meet environmental standards, the tank 65 further includes sampling points such as sampling point 73 to make measurements of the separated liquid and sampling point 74 to determine the contaminant content of the sand at the point of discharge, being an aperture 69 in the base of the tank 65.

The various inlets 90, 95, 115 are preferably tangential to the cylindrical unit so as to establish a vortex and provide a smoother entrance of the sand slurry. This has the further advantage of avoiding turbulence within the agitating fluid which may disrupt the separation of sand from the extracted oil.

The conical base 67 acts with preferably anchor impeller to prevent sand adherence by initiating gravity based flow towards the outlet 69. Accordingly, a paddle of the impeller is shaped to match that of the inclined surface of the conical base.

The motor 80 may be a variable speed motor to accommodate the cleaning requirement that is a high torque low speed mixing as well as a low torque high speed rotation for flushing water through the unit for cleaning.

The process using the embodiment shown in FIG. 2 commences by introducing the contaminated sand 115 into the unit 65 by means of a slurry pump 66 into the slurry inlet 63. It may be beneficial to introduce the sand in a more fluidized condition and to this end, water (such as seawater) may be introduced 90 by a water pump 61 arranged to direct the water into the slurry pump 66. Following separation, the contaminated sand supply 115 may be disconnected, with water only introduced into the unit through the slurry inlet in order to lift the layer of separated oil through the opening 87 of the weir 85. Water may also be introduced directly through a water inlet 64.

Figure 5:
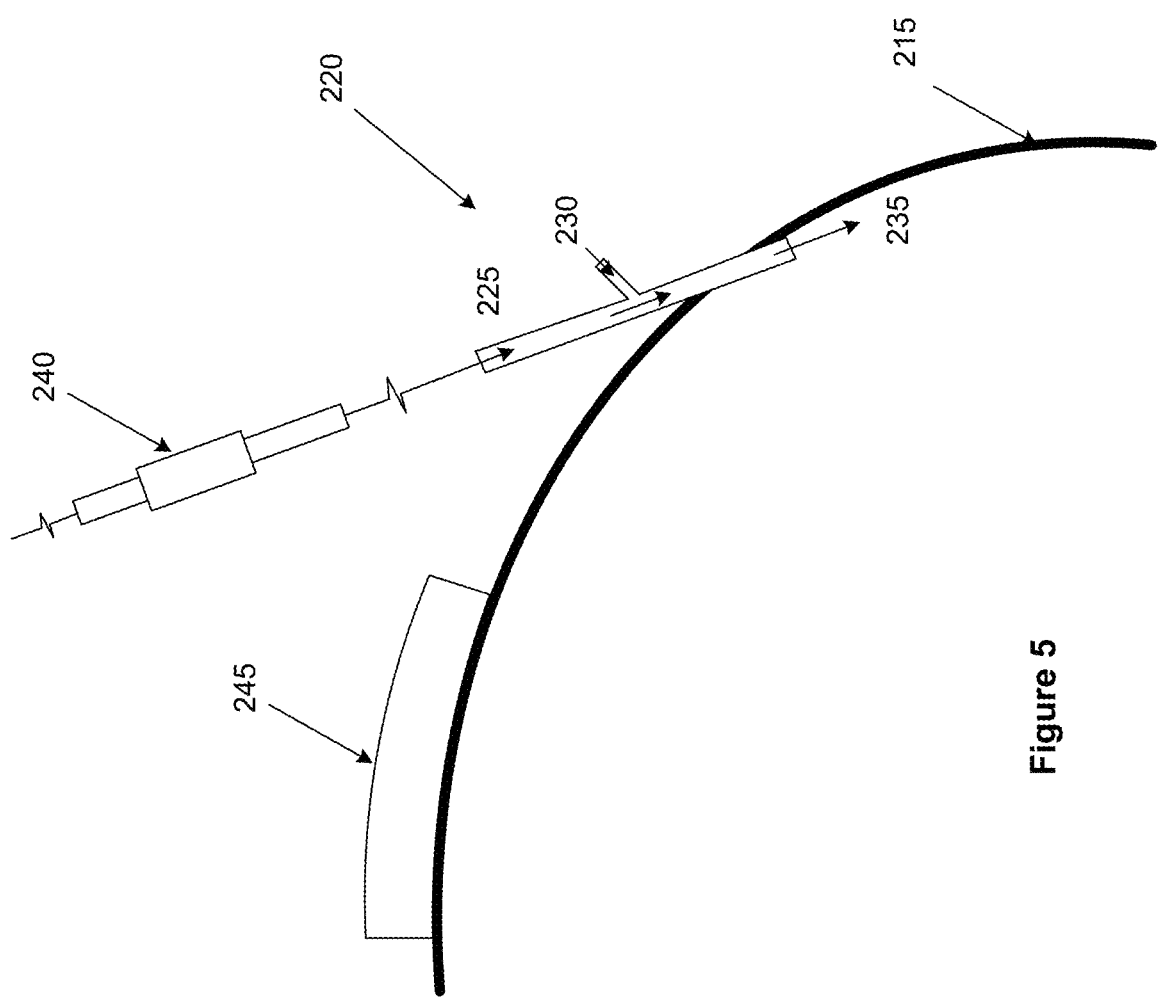
FIG. 5 is a schematic view of a sand cleaning system according to a further embodiment of the present invention.

With reference to the introduction of water, to improve oil separation from the water and sand, gas bubbles may be introduced into the unit 215. To introduce gas bubbles, an eductor may be used at the tangential inlets 64. FIG. 5 shows a possible arrangement, with the tangential water inlet 220 being in the form of an educator. When water passes 225 through the eductor 220, the vacuum created by the water 225 is sufficient to draw 230 the air/inert gas into the educator 220. Air bubbles are entrained into the inflowing water to promote the separation of suspended hydrocarbon droplets by introducing dissolved air bubbles that induce suspended hydrocarbons to coalesce and float to the surface.

If the mixing process requires the temperature to be elevated, a heating element or heating unit 240 to heat the inflowing water maybe introduced. The heating unit 240 may be in the form of a furnace (for instance coal, gas or electrically powered). In terms of electric heating, this may be achieved by a number of different means including, but not limited to: resistance heating, electric arc heating, induction heating, and dielectric heating. In a further embodiment, the unit 215 may include a heating element 245 to apply heat to the sand mixture during the process. The heating element may be externally applied, such as that shown in FIG. 5, or internally placed (not shown). Insulation may also be applied to the unit in order to retain heat during the process.

This skimming process will be described in more detail with reference to FIGS. 4A to 4C.

Apart from mechanical agitation it may also be beneficial to introduce a separating compound such as a surfactant to facilitate the separation of the oil from the sand. To this end, a supply 95 of the separation compound may be introduced through a chemical dosing pump 84 and injected directly into the unit.

The separation compound may be a surfactant, mainly ionic or non-ionic types or their combinations thereof, and may include a range of other chemical compounds. The separation compound may be designed in such a way that first it separates the oil from the contaminated sand and consequently facilitates the separation of the released oil from the washing medium which to be discarded through the skimming process.

Such a separation compounds include ionic liquids. More specifically it may be an imidazolium ionic liquid, such as from the group of ionic liquids based upon 1-alkyl-3-methylimidazolium cations.

The formulation is arranged to reduce the oil in sand content to <1% by weight, so as to permit the disposal of the sand from the unit within environmental regulations. Having met the regulation, the sand is then output through the bottom aperture 69, with the conical surface 67 of the base facilitating the flow of sand via gravity. The conical surface 67 may be at an inclination of <45°, to prevent adherence of sand to the surface 67.

The separated oil is removed 105 from the conical weir where the oil is trapped within the annular space, and any residual gas is vented 100 from the unit from an upper portion above the weir 85. Prior to disposal, the separated oil passes through a filter 71 to trap any residual solids. The unit further includes an output 110 for removing the stratified liquid layer resulting from the separation process, which also includes a filter 72.

Figure 3:
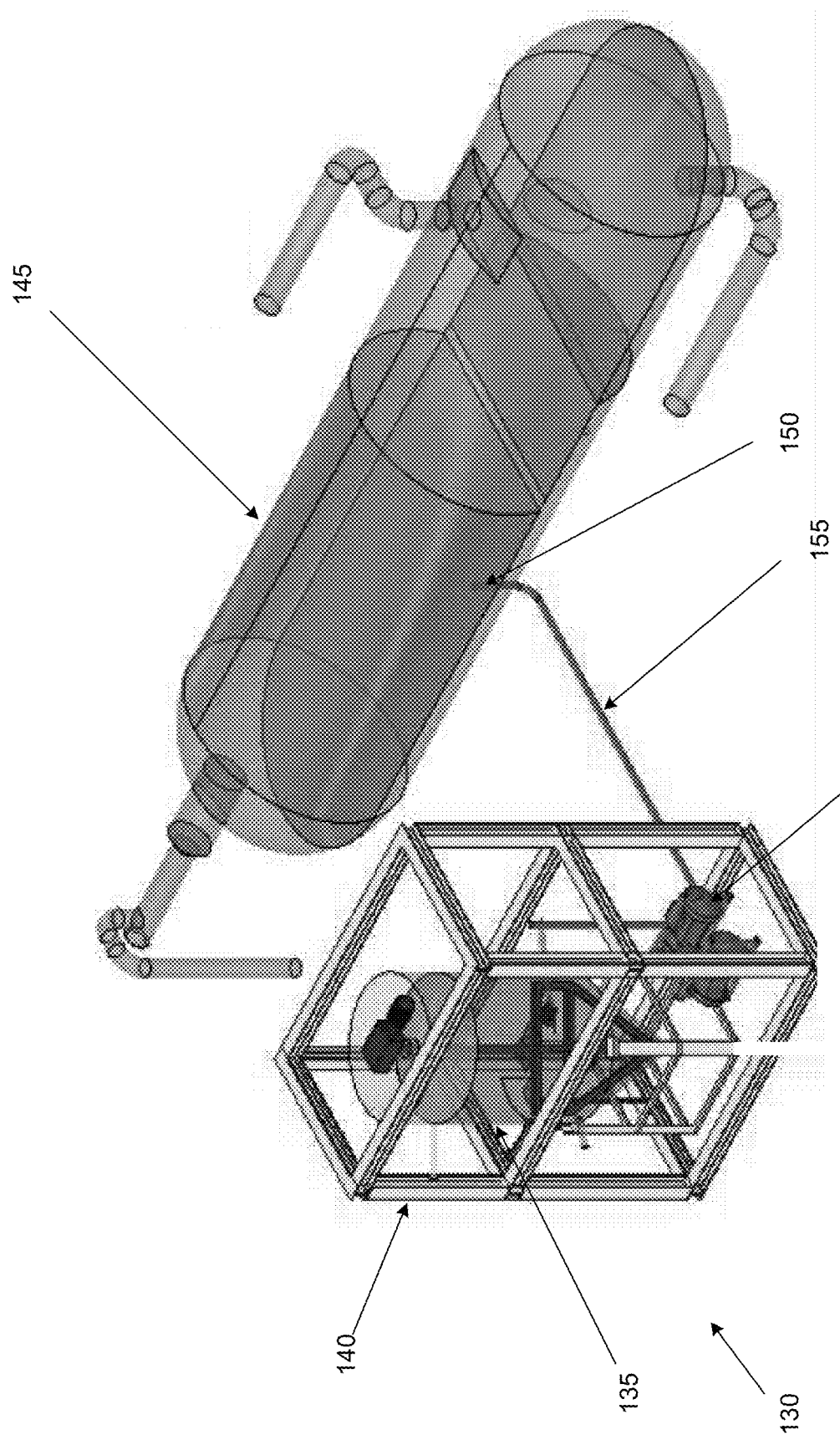
FIG. 3 is an isometric view of a mobile sand cleaning system according to a further embodiment of the present invention.

FIG. 3 demonstrates a further advantage of the present invention, whereby a mobile sand treatment system 130 is created. By encasing the unit 135 and inflow pumps 160 in a cage 140, to permit transport by crane or shipping. To this end, the cage may include recesses to receive forklift tines, lifting lugs for lifting by crane, twist lock castings for engagement by a container crane and skids mounted to the base to protect the unit from damage on contacting the ground or oil rig deck. Thus the unit can be positioned close to the source of untreated sand, such as the separator 145 shown in FIG. 3.

The process would involve transporting the system proximate to a sand source, such as a separator 145. The base output 150 of the separator is then connected 155 to the system pumps 160, and the fluidized sand drawn into the unit 135. The sand is then agitated with the separation formulation to yield the treated sand. Each sand source may include disposal facilities to receive any or all of the treated sand, skimmed oil and stratified liquid. Alternatively, the system 130 may act as a means of transport to deliver the output to a preferred disposal site. For instance, as the oil content following treatment is <1%, the system 130 may dispose of the treated sand directly to the sea, subject to the normal environmental regulations.

The system may allow up to 1 t of untreated sand per batch, though the batch size will depend upon application, with this example not limiting the scope of the invention. A 1:2 sand to water ratio may also provide sufficient fluidization, whilst also maintaining shear forces by the impeller at a reasonable level and consequently keeping the motor to a reasonable power output capacity.

Figure 4:
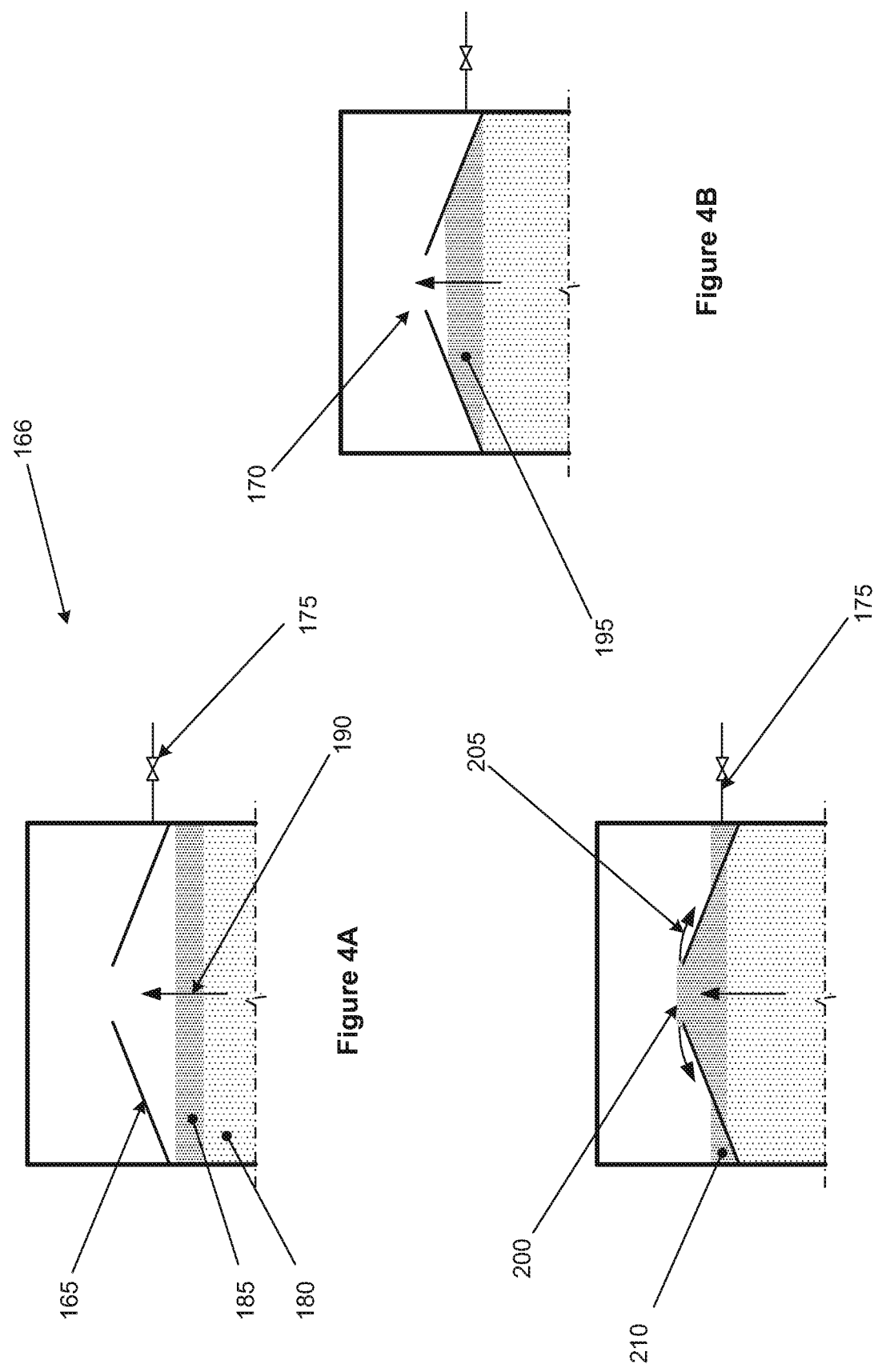
FIGS. 4A to 4C are progressive cross sectional views of a sand cleaning unit according to one embodiment of the present invention.

FIGS. 4A to 4C show a skimming process for isolating the separated oil layer for subsequent disposal of the oil.

Here the cleaning unit 166 includes a conical weir 165 located near the top of the unit 166. The unit includes a discharge outlet 175 located in a space directly above the conical weir 165.

On separation, a top layer of oil 185 will sit on a liquid layer 180. By introducing water to the unit the oil layer will progressively rise 190 and approach the conical weir 165. As shown in FIG. 4B the oil layer 195 thickens as it travels up the inside surface of the conical weir 165 to eventually project 200 from the opening 170 and flow 205 to an annular space 210 located about the conical weir 165. As oil is collected in this annular space 210, it can then be discharged through the outlet 175. Thus, by introducing water to the unit, the oil layer can be skimmed and removed through a simple and effective process. The inclined surface on the inside of the conical weir 165 prevents oil being trapped in the internal chamber beneath the weir 165.

The invention claimed is:

1. A system for sand cleaning, comprising:
   a cleaning unit including:
   a chamber having a first inlet to receive oil-impregnated sand, a second inlet to receive a separation compound that facilitates a separation process of oil from the oil-impregnated sand, a third inlet to receive inflowing water that lifts the separated oil, a first outlet to discharge the separated oil from the chamber, a second outlet to remove a separated liquid resulting from the separation process, and an aperture at a base of the chamber to discharge separated sand resulting from the separation process;
   an impeller, located adjacent to the base of the chamber, to be rotated to mix the separation compound with the oil-impregnated sand; and
   an oil trap, located inside the chamber and including the first outlet where the separated oil is discharged,
   wherein the oil trap includes a plate in a shape of a frusto-conical weir forming a base of the oil trap, and the oil trap is arranged to trap the separated oil entering an opening at a top of the frusto-conical weir and prevent the separated oil from returning to the chamber;
   a first filter connected to the first outlet; and
   a second filter connected to the second outlet.

2. The system according to claim 1, further comprising: a water pump, connected to the first inlet of the cleaning unit, to add fluid to the oil-impregnated sand prior to the oil-impregnated sand entering the cleaning unit.

3. The system according to claim 1, wherein the chamber of the cleaning unit further includes:
   a first sampling point, adjacent to the second outlet, for determining measurements of the separated liquid, and
   a second sampling point, adjacent to the aperture, for determining a contaminant content of the separated sand at the aperture.

4. The system according to claim 1, wherein the cleaning unit further includes a heating element to elevate a temperature inside the cleaning unit.

5. The system according to claim 1, wherein the third inlet for receiving the inflowing water includes an eductor to introduce air or gas bubbles into the inflowing water.

6. The system according to claim 1, wherein the third inlet for receiving the inflowing water includes a heating unit to heat the inflowing water.

7. The system according to claim 1, wherein the base of the chamber of the cleaning unit is in a conical shape that includes an inclined surface, the inclined surface arranged to direct the separated sand towards the aperture.

8. The system according to claim 7, wherein the impeller includes a paddle that is shaped to rotate proximate to the inclined surface of the base of the chamber.

9. The system according to claim 1, further comprising:
a cage that encases the cleaning unit.

10. The system according to claim 1, wherein the chamber is elongate and arranged vertically.

\* \* \* \* \*